(12) United States Patent
Maiorana et al.

(10) Patent No.: US 7,720,063 B2
(45) Date of Patent: May 18, 2010

(54) METHOD APPARATUS AND SYSTEM FOR ACCELERATED COMMUNICATION

(75) Inventors: Jason B. Maiorana, Vienna, VA (US); Joseph J. Boone, Fairfax, VA (US)

(73) Assignee: VT iDirect, Inc., Herndon, VA (US)

( * ) Notice: Subject to any disclaimer, the term of this patent is extended or adjusted under 35 U.S.C. 154(b) by 549 days.

(21) Appl. No.: 11/571,488

(22) PCT Filed: Jul. 1, 2005

(86) PCT No.: PCT/US2005/023605

§ 371 (c)(1),
(2), (4) Date: Jan. 5, 2007

(87) PCT Pub. No.: WO2006/014373

PCT Pub. Date: Feb. 9, 2006

(65) Prior Publication Data

US 2008/0285581 A1     Nov. 20, 2008

Related U.S. Application Data

(60) Provisional application No. 60/584,490, filed on Jul. 2, 2004.

(51) Int. Cl.
*H04L 12/56* (2006.01)
(52) U.S. Cl. .................... 370/389; 370/395.21
(58) Field of Classification Search ............... 370/231, 370/389, 395.21, 412–418
See application file for complete search history.

(56) References Cited

U.S. PATENT DOCUMENTS

| | | | | |
|---|---|---|---|---|
| 5,940,390 A | * | 8/1999 | Berl et al. ................ | 370/389 |
| 6,735,219 B1 | * | 5/2004 | Clauberg .................. | 370/474 |
| 6,742,016 B1 | * | 5/2004 | Bhoj et al. ................ | 709/207 |
| 6,888,824 B1 | * | 5/2005 | Fang et al. ................ | 370/359 |
| 7,480,308 B1 | * | 1/2009 | Cohen et al. .............. | 370/412 |
| 2001/0021197 A1 | | 9/2001 | Foore et al. | |
| 2003/0112802 A1 | * | 6/2003 | Ono et al. ................. | 370/389 |
| 2003/0120795 A1 | * | 6/2003 | Reinshmidt ............... | 709/232 |
| 2003/0214908 A1 | * | 11/2003 | Kumar et al. ............. | 370/234 |
| 2003/0229720 A1 | * | 12/2003 | Kiremidjian et al. ...... | 709/253 |
| 2004/0066763 A1 | * | 4/2004 | Hashimoto et al. ........ | 370/329 |
| 2005/0068896 A1 | * | 3/2005 | Pazos ....................... | 370/235 |
| 2005/0078673 A1 | * | 4/2005 | Sakamoto et al. ......... | 370/389 |
| 2005/0201373 A1 | * | 9/2005 | Shimazu et al. ........... | 370/389 |
| 2007/0121506 A1 | * | 5/2007 | Wydrowski et al. ....... | 370/231 |

* cited by examiner

*Primary Examiner*—William Trost, IV
*Assistant Examiner*—Emmanuel Maglo
(74) *Attorney, Agent, or Firm*—Oblon, Spivak, McClelland, Maier & Neustadt, L.L.P.

(57) ABSTRACT

A TCP acceleration apparatus includes input queues each having a service level and storing at least one session packet list having packets from a same TCP session. The apparatus also includes a distributor connected to the input queues and to the client and configured to retrieve a session packet from a session packet list at a top of an input queue for transmission to the client. The input queue at the service level selected by the distributor moves the session packet list at a top of the input queue to a bottom of the input queue after the session packet is retrieved by the distributor. Acceleration apparatuses including other features, as well as a method, computer program product and system for TCP acceleration are also discussed.

19 Claims, 18 Drawing Sheets

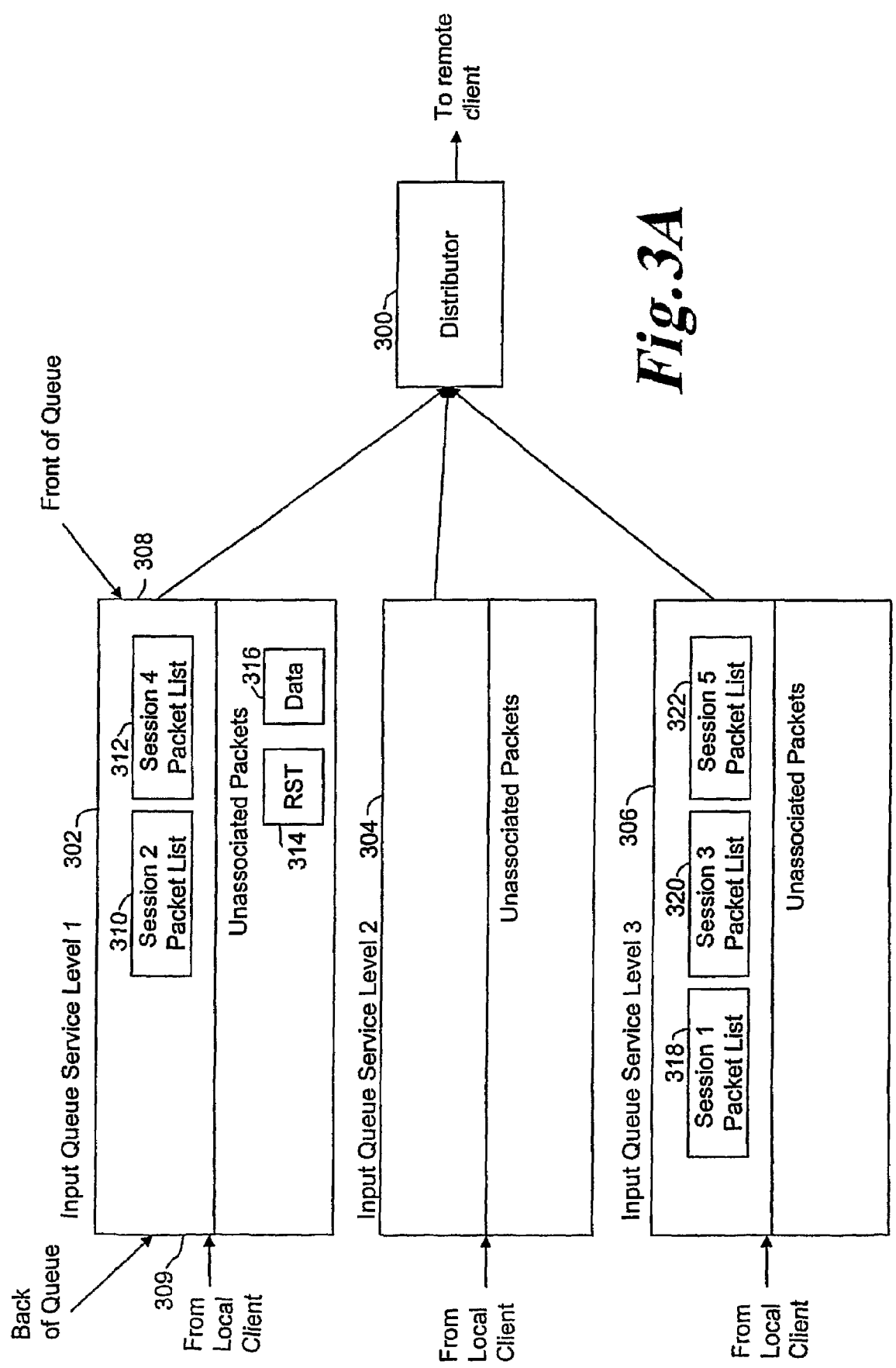

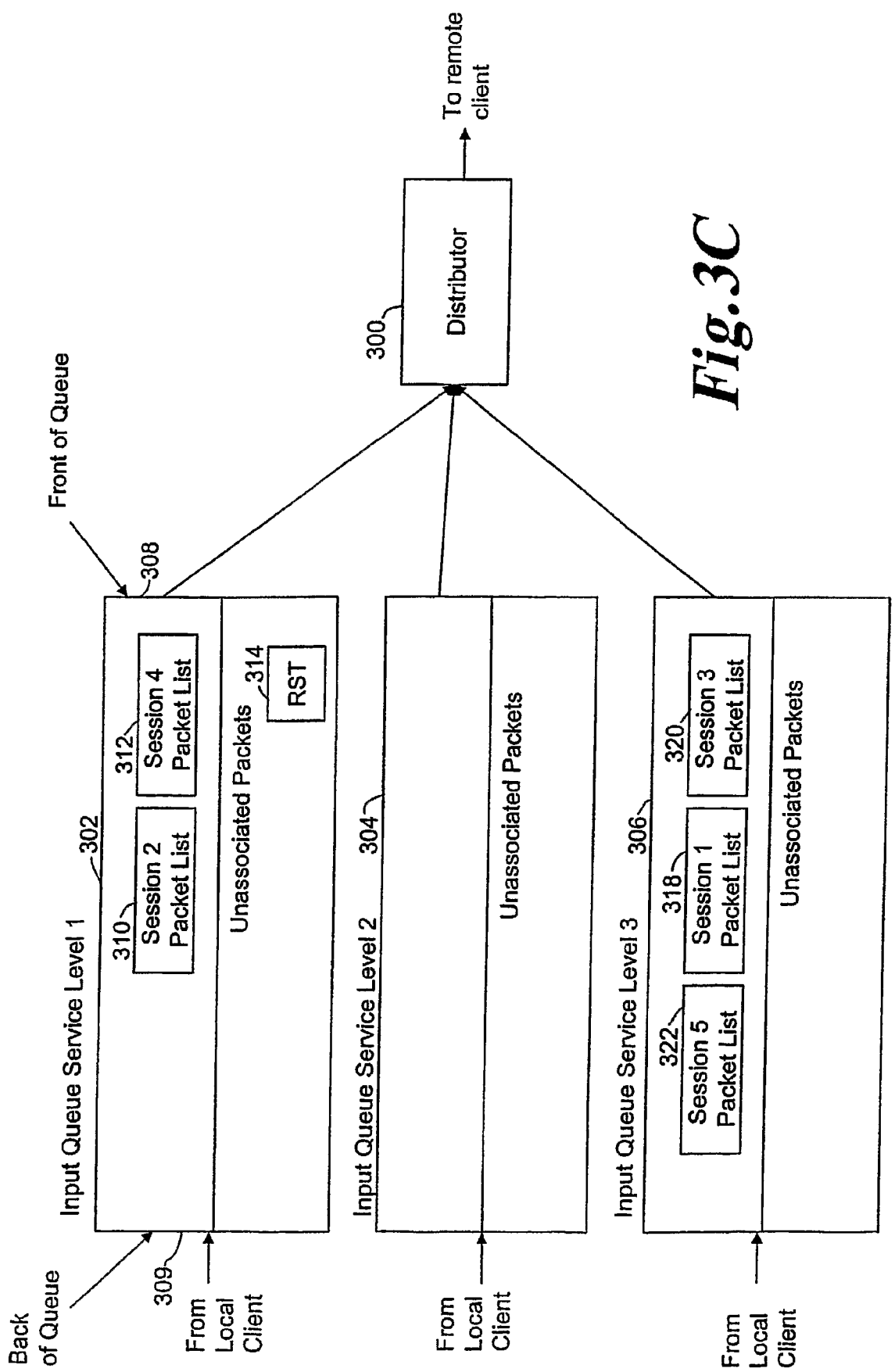

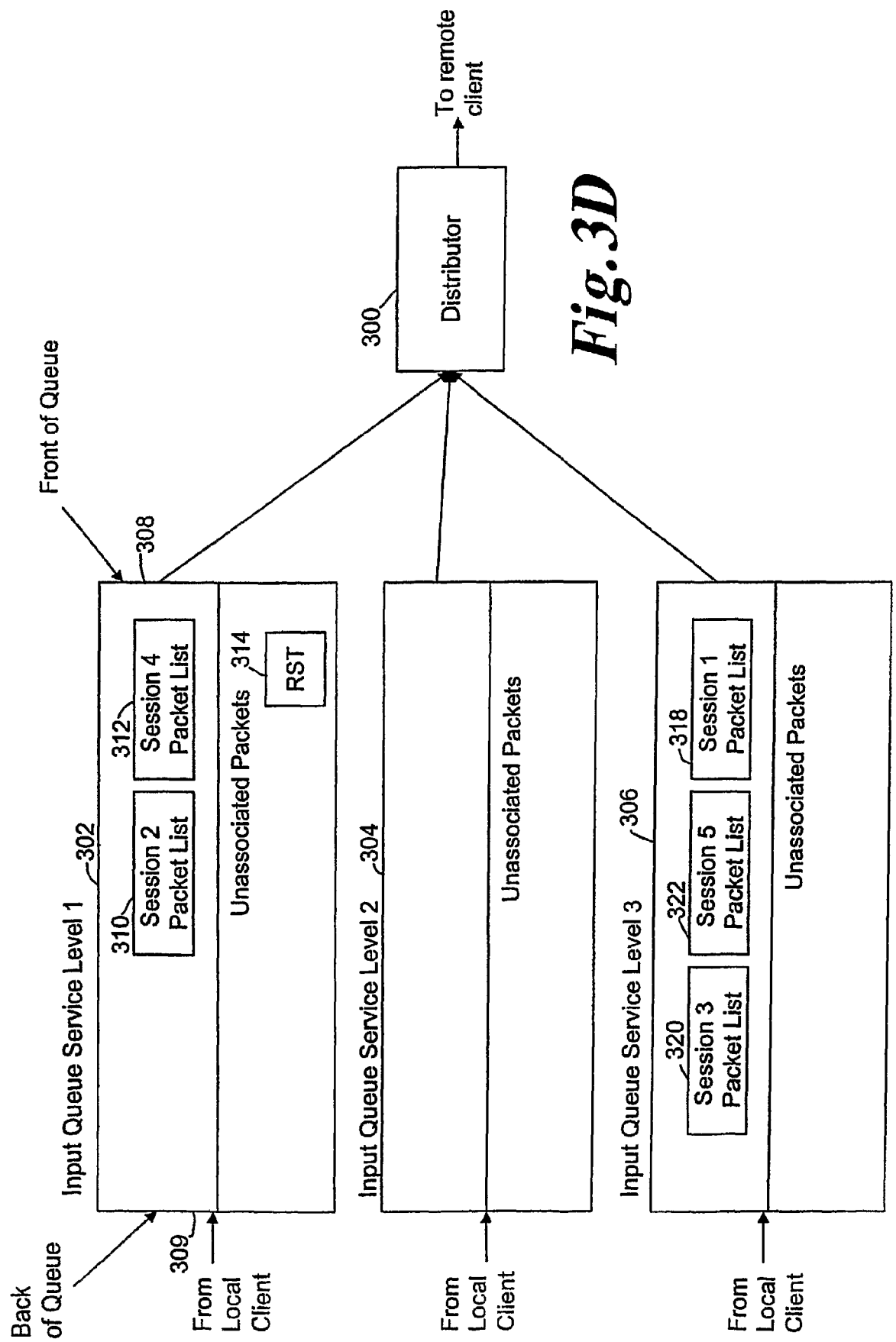

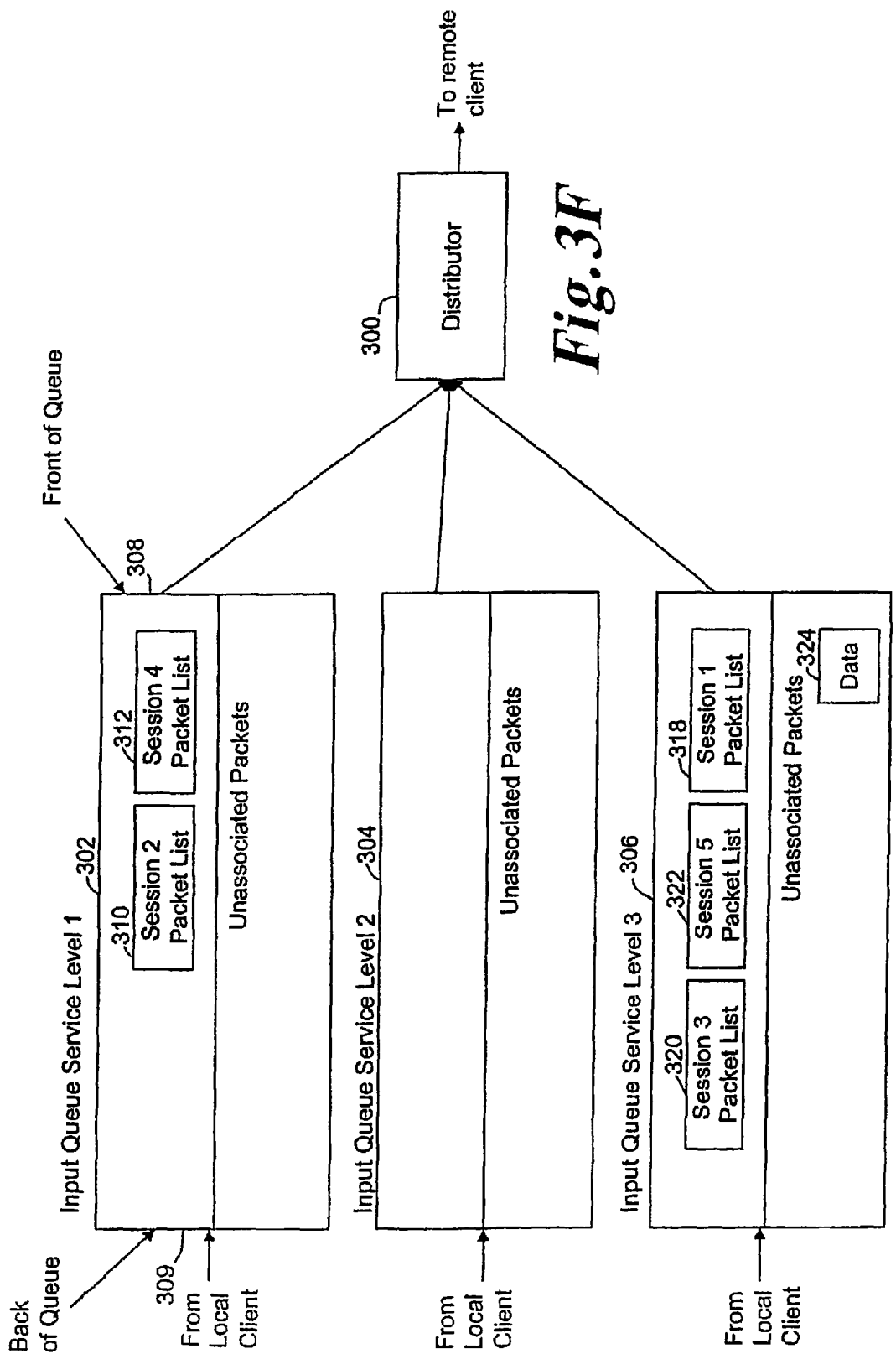

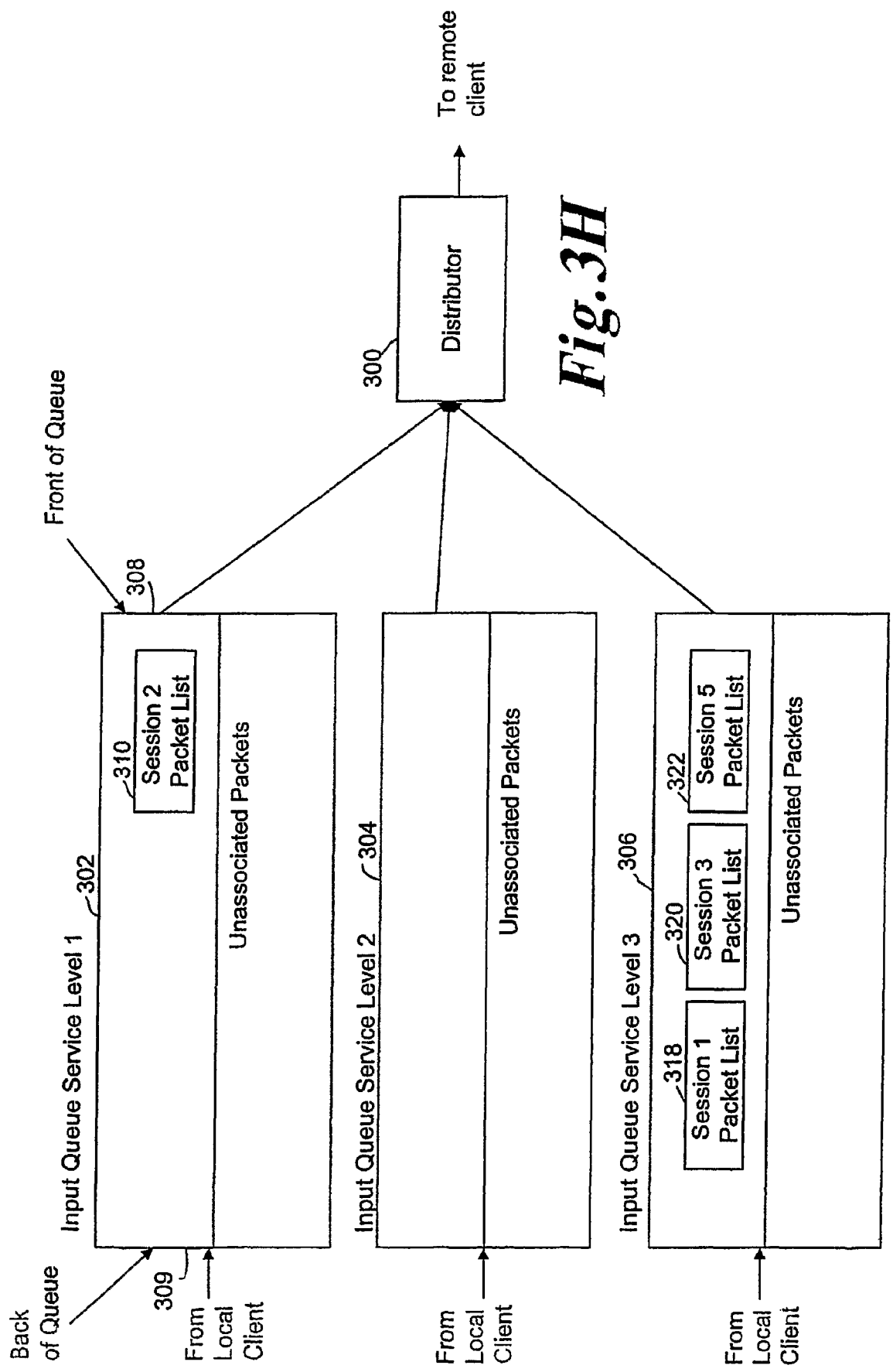

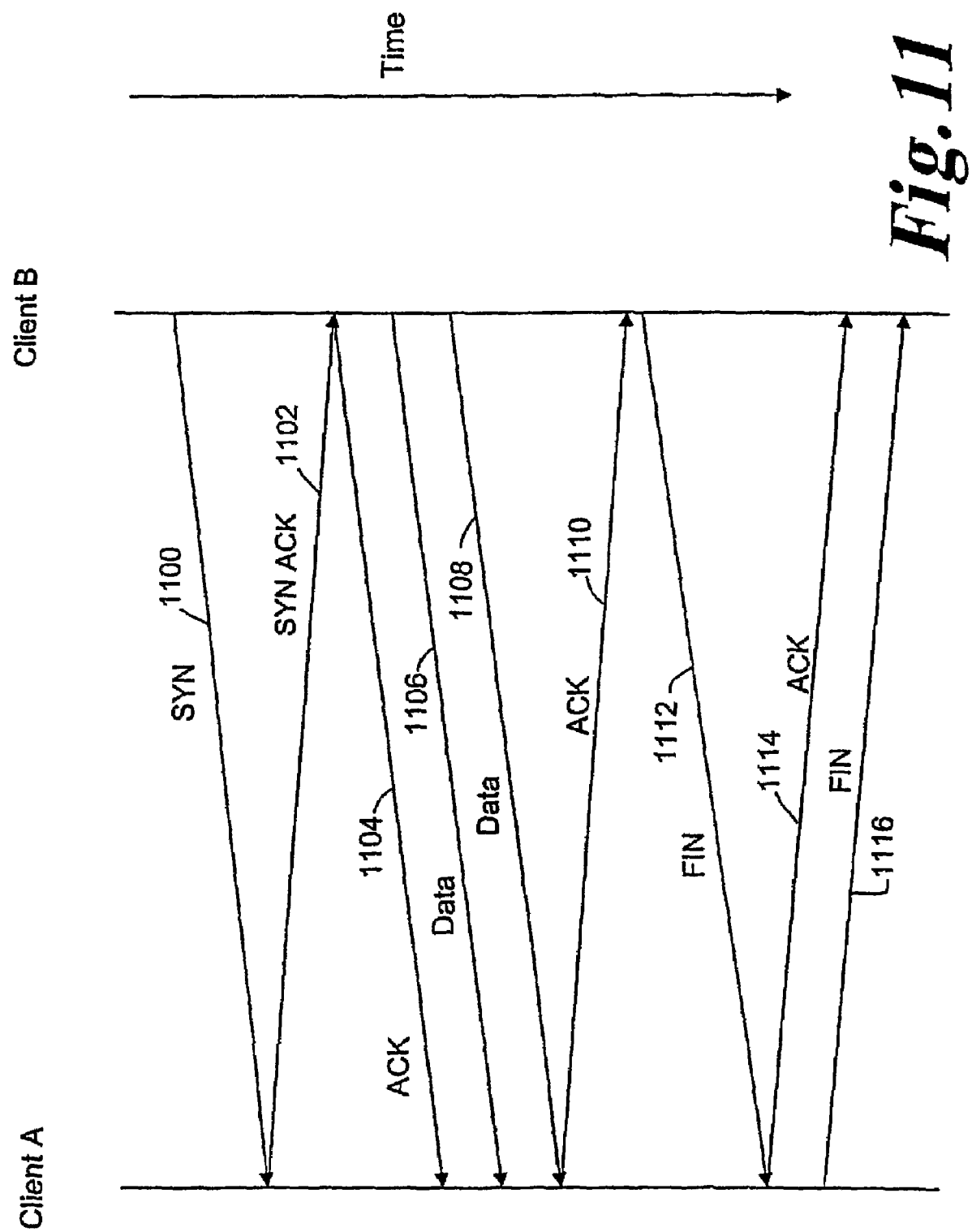

METHOD APPARATUS AND SYSTEM FOR ACCELERATED COMMUNICATION

CROSS-REFERENCE TO RELATED APPLICATIONS

This application contains subject matter related to U.S. patent application Ser. No. 10/721,419, filed Nov. 26, 2003, and this application claims the benefit of the earlier filing date of U.S. Provisional Application No. 60/584,490, filed Jul. 2, 2004, the entire contents of each of which are hereby incorporated herein by reference.

BACKGROUND OF THE INVENTION

1. Field of the Invention

The present invention relates generally to the field of accelerating communications across a network, and in particular accelerating one or more Transmission Control Protocol (TCP) communication sessions across a network, for example across a satellite communication network.

2. Discussion of the Background

TCP attempts to provide a reliable communications channel over an unreliable network by arranging for packets to arrive intact and in order at their proper destination. TCP uses a sliding window system allowing up to 65535 bytes to be outstanding at any given time. To avoid over-saturating the network, TCP also implements algorithms such as congestion avoidance and slow start. Features of TCP are further described in Stevens, W. Richard, *TCP/IP Illustrated Volume 1: The Protocols*, Addison-Wesley, Massachusetts, 1994, which is hereby incorporated herein by reference in its entirety.

The TCP protocol does not readily support channels with high latency or high loss. TCP interprets the absence of timely acknowledgements as congestion and under these conditions, TCP reduces its transmission speed and window sizes. In the case of high latency, even with a lossless channel, TCP allows a maximum of 65535 bytes to be sent before an acknowledgement is received, which may not be adequate for a high bandwidth satellite link, for example a geosynchronous satellite link.

Conventional network communication systems may be configured to rely on endpoint configurations to overcome satellite link delay and loss, such as using SACK, as described in "TCP Selective Acknowledgment Options," October 1996, IETF RFC-2018, incorporated herein by reference in its entirety, or TCP window compression, as described in "TCP Extensions for High Performance," May 1992, IETF RFC-1323, incorporated herein by reference in its entirety. However, conventional schemes may require a complex or unique configuration for each communication node, and also may still result in delayed or lossy communications.

Other conventional communication systems having a relatively fast communication segment with a high latency and/or low loss (e.g., a wired connection) in series with a relatively slow communication segment having low latency and/or low reliability (e.g., a satellite link) may include a method of TCP acceleration to improve communication reliability and to allow client computers that communicate through the slow segment to use normal TCP protocol (i.e., without repeated unnecessary retransmission of packets). However, conventional TCP acceleration systems may not efficiently manage computing resources, such as processor execution cycles, memory, disk space, and channel throughput, etc. . . .

For example, the bandwidth of a link, multiplied by the round trip time over that link is known as the link's Bandwidth Delay Product (BDP). For example, a 5 megabit/sec (Mb/s) satellite link with a latency of 500 milliseconds (ms) has a bandwidth delay product of 312,500 bytes. Thus, in a conventional method 312,500 bytes would have to be sent without waiting for an acknowledgement in order to fully utilize the link. However, 312,500 bytes is greater than the number of bytes that may be sent before receiving an acknowledgment according to the requirements of TCP.

Another issue that may arise in the presence of high latency is slow start. TCP has a slow start algorithm that may increase transmission speed once every round trip. When the round trips take a long time, it can take a significant amount of time to get past the slow start algorithm. If packets are lost and the TCP session slows down, the slow start phase will have to be overcome again, resulting in further delays.

Further, events may occur that result in significant and rapid increase of system resources demanded by a particular TCP session or by an application that shares resources with the TCP acceleration system. For example, during a software upgrade to plural users, significant resources may be required by a communication application to transfer files. Conventional TCP acceleration methods may be unable to efficiently react to this change in required resources. When data has been accelerated over a satellite link, for example, but is not being received by the remote client, a full BDP worth of data may be queued. If this situation occurs in even a small number of sessions, system memory may be quickly exhausted when the BDP is high.

Further, TCP sessions involve numerous states and timers which consume CPU cycles, and there are a finite number of TCP sessions, which can be simultaneously handled. In addition, there may be a relatively high latency link between two acceleration layers, so bandwidth may be wasted on traffic that has no hope of arriving at its destination.

Further, increased "virtual throughput" due to TCP acceleration may require an increased use of memory. However, background TCP acceleration methods may disadvantageously allocate too much memory to a TCP session.

Further, background TCP acceleration methods may transmit uncompressed packets regardless of CPU utilization, thereby resulting in disadvantageously high usage of valuable communication resources.

Further, packets transmitted from a first client to a first acceleration layer using a conventional acceleration method may disadvantageously be received out of sequence at the first acceleration layer. A conventional first acceleration layer may retransmit packets in the order they are received. Thus, when they arrive at the second acceleration layer out of sequence, an inefficient retransmission across the slow segment is required to correct the packet sequence.

Further, some clients/TCP stacks do not open their window size as large as they advertise (i.e., the MSS or maximum segment size of a client). Thus, a background TCP acceleration scheme may never send a particular packet (or might disadvantageously delay the transmission of a packet) if the packet is sized according to the reported window size of that client.

Further, conventional acceleration methods may not ensure fairness across TCP sessions within a given service level (e.g., a Quality of Service, a desired rate, a desired latency, etc. . . . ). That is, in a conventional method, a first TCP session may be allocated more communication resources than a second TCP session, even if they are operating at the same service level. Further, in the conventional acceleration methods a user having a large amount of data to transmit may disadvantageously slow or starve a different user having a smaller amount of data to transmit.

FIG. 10 shows an example of a conventional TCP communication system without TCP acceleration. In this example, client A 100 communicates with client B 112 using communication segment 114. FIG. 11 shows an example of a conventional TCP session between clients A and B of FIG. 10. Client B initiates the session by sending a packet having the synchronize bit (i.e., SYN bit) set in the header SYN 1100 to client A, which replies with SYN ACK 1102. Client B responds with ACK 1104 and sends data packets 1106 and 1108 to client A. Client A replies with ACK 1110 and client B initiates conclusion of the TCP session by sending a packet having the finish bit (i.e., FIN bit) set in the header FIN 1112 to client A, which sends ACK 1114 and FIN 1116 to conclude the TCP session.

SUMMARY OF THE INVENTION

Accordingly, one object of this invention is to provide a novel TCP acceleration apparatus for sending packets to a client. The apparatus includes plural input queues each having a service level and configured to store at least one session packet list having packets from one TCP session, and each packet in each session packet list stored in a particular input queue having the service level of the input queue. The apparatus also includes a distributor connected to the input queues and to the client, the distributor configured to retrieve a session packet from a session packet list at a top of an input queue for transmission to the client; and the input queue at the service level selected by the distributor further configured to move the session packet list at a top of the input queue to a bottom of the input queue after the session packet is retrieved by the distributor.

Another object of this invention is to provide a novel TCP acceleration apparatus including a first storage space configured to store data associated with a first TCP session and a second storage space configured to store data associated with a second TCP session. A size of the first storage space is changed when a communication requirement of the second TCP session changes.

Another object of this invention is to provide a novel TCP acceleration apparatus for accelerating a TCP session between first and second clients and connected to the first client by a first unaccelerated communication segment, and connected to another TCP acceleration apparatus by an accelerated communication segment. The another TCP acceleration apparatus is connected to the second client by a second unaccelerated communication segment. The TCP acceleration apparatus includes a storage area configured to store data associated with the TCP session. The first unaccelerated communication segment has a first bandwidth delay product and the second communication segment has a second bandwidth delay product that is less than the first bandwidth delay product. The first bandwidth delay product is a product of a bandwidth of the first unaccelerated communication segment and a delay of the first unaccelerated communication segment, the second bandwidth delay product is a product of a bandwidth of the second unaccelerated communication segment and a delay of the second unaccelerated communication segment, and a size of the storage area is based on the second bandwidth delay product.

Another object of this invention is to provide a novel TCP acceleration apparatus for accelerating a TCP session between first and second clients and connected to the first client and another TCP acceleration apparatus which is connected to the second client. The TCP acceleration apparatus includes a packet divider configured to receive a first packet sent from the first client to the second client and send second and third packets including a content of the first packet to the another acceleration apparatus when the second client is configured to receive packets that are smaller than an advertised maximum segment size of the second client.

Another object of this invention is to provide a novel TCP acceleration apparatus for accelerating a TCP session between first and second clients and connected to the first client and another TCP acceleration apparatus which is connected to the second client. The TCP acceleration apparatus includes an ACK reducer configured to receive plural ACK packets sent from the first client to the second client and send an aggregated ACK message to another TCP acceleration apparatus representing the plural received ACK packets.

Another object of this invention is to provide a novel TCP acceleration apparatus for accelerating a TCP session between first and second clients and connected to the first client and another TCP acceleration apparatus which is connected to the second client. The TCP acceleration apparatus includes a header reducer configured to receive a TCP packet sent from the first client to the second client and send a reduced header size packet to the another TCP acceleration apparatus including a reduced size header and all information included in the TCP packet. The reduced header size packet is smaller than the TCP packet.

Another object of this invention is to provide a novel TCP acceleration apparatus for accelerating a TCP session between first and second clients and connected to the first client and another TCP acceleration apparatus which is connected to the second client. The TCP acceleration apparatus includes a content reducer configured to receive a received number of TCP packets sent from the first client to the second client and send a reduced number of packet to the another TCP acceleration apparatus including all information in the received number of TCP packets. The reduced number of packets is smaller than the received number of TCP packets.

Another object of this invention is to provide a novel TCP acceleration apparatus for accelerating first and second TCP sessions. The TCP acceleration apparatus includes a session manager configured to manage the first and second TCP sessions simultaneously. An IP space of the first TCP session is different than an IP space of the second TCP session.

Another object of this invention is to provide a novel TCP acceleration apparatus for accelerating at least one accelerated TCP session. The acceleration apparatus includes one or more session link layers between first and second clients configured to carry data communications for the at least one accelerated TCP sessions and one or more dedicated retransmission link layers configured to carry all retransmission packets resulting from a packet retransmission request in any of the at least one accelerated TCP sessions by the first or second client.

Another object of this invention is to provide a novel TCP acceleration apparatus configured to communicate across a slow communication segment with another TCP acceleration apparatus. The TCP acceleration apparatus includes a storage space configured to store data associated with a TCP session, wherein a size of the storage space is based on a bandwidth delay product (BDP) of the slow communication segment.

Another object of this invention is to provide a novel method, computer program product and system for TCP acceleration with features similar to those discussed above.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3A is a block diagram of a distributor integration function according to an embodiment of the present invention;

FIG. 3C is a block diagram of a distributor integration function according to an embodiment of the present invention;

FIG. 3D is a block diagram of a distributor integration function according to an embodiment of the present invention;

FIG. 3F is a block diagram of a distributor integration function according to an embodiment of the present invention;

FIG. 3H is a block diagram of a distributor integration function according to an embodiment of the present invention;

FIG. 11 is a timing diagram of an unaccelerated TCP session for the system of FIG. 10.

DETAILED DESCRIPTION OF THE INVENTION

Figure 1:
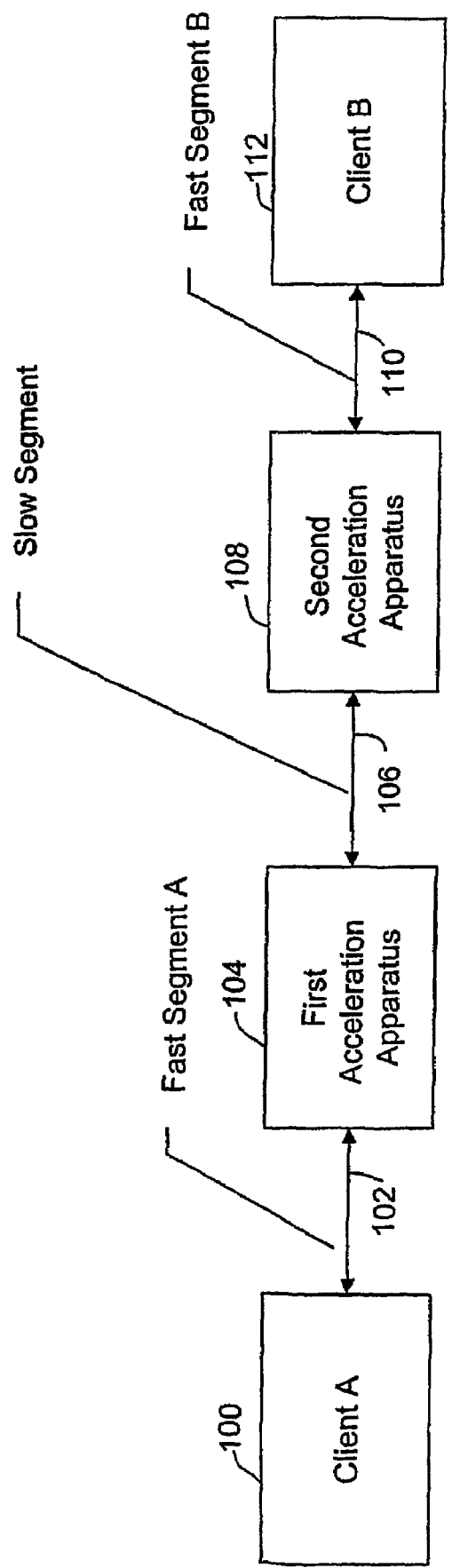
FIG. 1 is a block diagram of an accelerated communication system according to an embodiment of the present invention.

Referring now to the drawings, wherein like reference numerals designate identical or corresponding parts throughout the several views, and more particularly to FIG. 1 thereof, FIG. 1 shows an example of a system for accelerated communication. The system includes client A 100 configured to communicate with a first acceleration apparatus 104 via a relatively fast communication segment, fast segment A 102, for example a wired network segment. The first acceleration apparatus 104 is configured to communicate with a second acceleration apparatus via a communication segment that is relatively slow (i.e., relatively high latency) slow segment 106, for example a satellite communication segment. The second acceleration apparatus 108 is configured to communicate with client B 112 via Fast Segment B 110. In this example, client A is a local client to the first acceleration apparatus 104 and a remote client to the second acceleration apparatus 108. Likewise, client B 112 is a local client to the second acceleration apparatus 108 and a remote client to the first acceleration apparatus 104.

Figure 2:
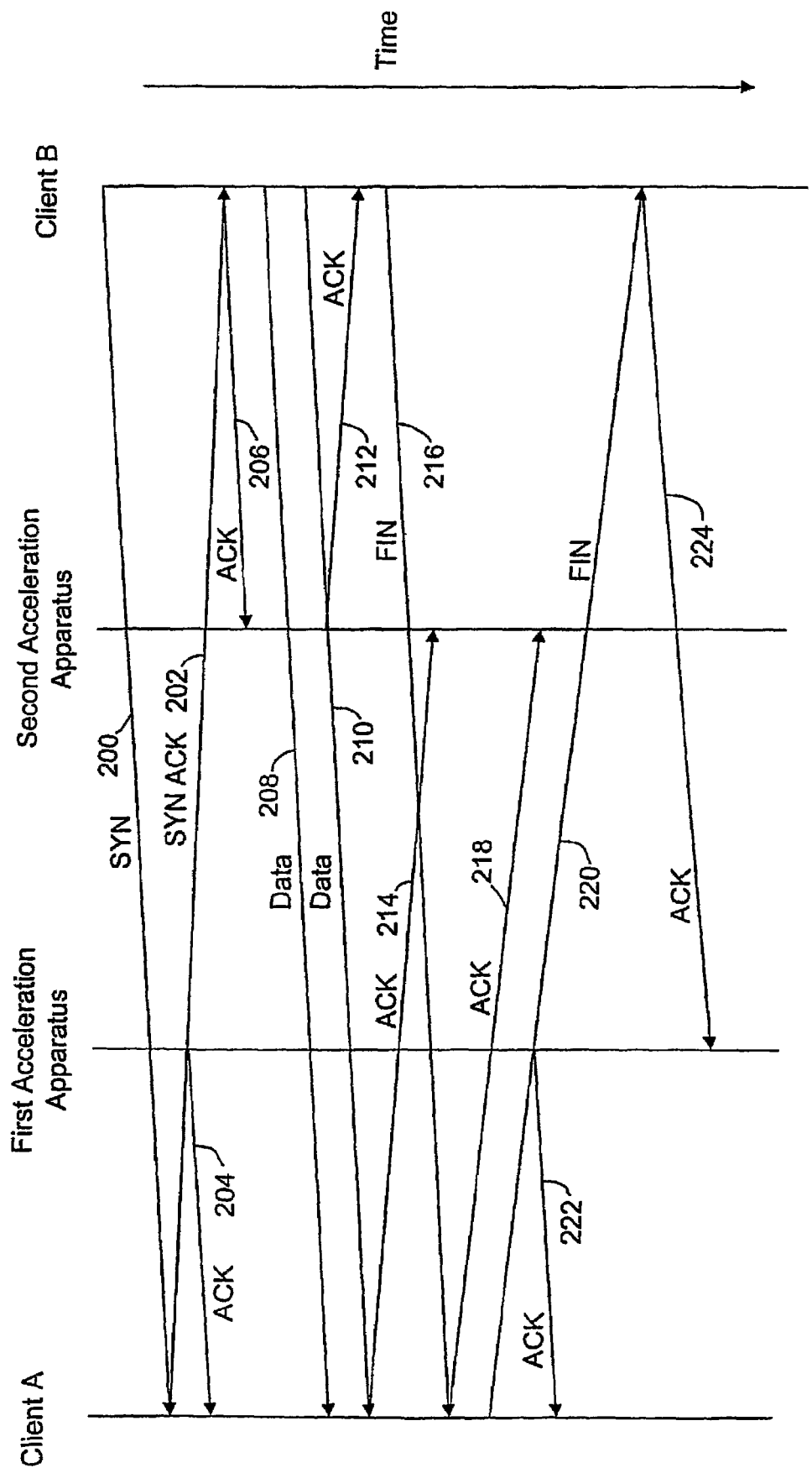
FIG. 2 is a timing diagram of an accelerated TCP session according to an embodiment of the present invention.

FIG. 2 is a timing diagram showing an accelerated TCP session according to an embodiment of the present invention. Client B starts the TCP session by sending SYN 200 to the second acceleration apparatus, which forwards the SYN 200 to the first acceleration apparatus, which forwards the SYN 200 to client A. Alternatively, each of the acceleration apparatuses may be configured to send a SYN ACK to client B. In this example, client A sends SYN ACK 202 to the client B via the first and second acceleration apparatuses. When the SYN ACK 202 is received by the first acceleration apparatus, it sends ACK 204, thereby accelerating the ACK time perceived by client A. When client B receives SYN ACK 202, it sends ACK 206, data 208 and data 210. Upon receipt of data 210, the second acceleration apparatus sends ACK 212 thereby accelerating the ACK time perceived by client B. Client A acknowledges data 210 with ACK 214, which is forwarded by the first acceleration apparatus to the second acceleration apparatus. The second acceleration apparatus does not forward ACK 218 to client B. In this example, client B initiates termination of the session by sending FIN 220, and the first acceleration apparatus sends ACK 222 to client A. When client B receives FIN 220 it sends ACK 224, which is forwarded by the second acceleration apparatus to the first acceleration apparatus, but which is not forwarded by the first acceleration apparatus to client A, because client A has already been sent ACK 222.

Conventional TCP may provide communication over links that have a stable bandwidth characteristic. TDMA channels, however, may quickly vary in their available bandwidth based upon usage and demand. Unaccelerated TCP, and conventionally accelerated TCP may operate with a fixed estimate of link bandwidth and thus may not perform ideally, causing the TCP traffic flow to be erratic. Erratic TCP transfers have poorer performance due to the endpoint TCP transmitter perceiving these situations as congestion.

The present invention includes a distributor integration feature, in which the TCP acceleration apparatus reacts in real time to immediate information on bandwidth availability. Further, the present invention may advantageously allow balanced treatment of packets in a Quality of Service (QoS) driven system. The distributor integration feature includes the communication of available bandwidth for each service level from the bandwidth distributor to the TCP accelerator. TCP sessions within each QoS service level are then given equal access to their available bandwidth.

Thus, an acceleration apparatus according to an embodiment of the present invention may take into account the service level associated with a given packet when deciding on the transmission priority of that packet. In particular, packets from various users may be queued in separate queues for each service level. Further, the packets may be queued based on their order of arrival at the acceleration layer. Alternatively, packets transmitted from a first client to the first acceleration layer may arrive at the first acceleration layer out of sequence. An out-of-sequence queuing feature of the present invention may reorder packets at the first acceleration layer before sending those reordered packets across the slow segment.

FIGS. 3A-3H are block diagrams showing an example of a distributor integration feature that allows service level queuing for intercession fairness according to an embodiment of the present invention. FIGS. 3A-3H show three input queues configured to receive packets from one or more local clients. Packets from the local clients are placed in the bottom of the queue 309 and move through the queue as discussed below. Each of the three queues is associated with a particular service level and all the packets stored in a queue are associated with that service level. Input queue service level 1 302 has service level 1, input queue service level 2 304 has a service level 2, and input queue service level 3 306 has service level 3. Each of the queues is also configured to send packets to a distributor 300 from the top of the queue 308. The distributor 300 is configured to send packets to a remote client via a remote acceleration layer (e.g., second acceleration layer 108).

Each input queue may include at least two parallel queues: a first queue configured to hold packets arranged in packet lists, where the packets in each packet list are associated with one TCP session; and a second queue configured to hold packets that are not associated with any TCP session. All packets in each of the first and second queue within a particular input queue have the same service level.

FIG. 3A shows an example of a distributor integration process in which the input queue service level 1 302 includes session 4 packet list 312 at the top of the queue and session 2 packet list 310 next in the queue. The input queue service level 1 302 also includes a data packet 316 and a RST packet 314 that are not associated with any TCP session. Input queue service level 2 304 does not include any packets. Input queue service level 3 306 includes session 5 packet list 322 at the top of the queue, session 3 packet list 320 next in the queue, and session 1 packet list 318 next in the queue. There are no unassociated packets in the input queue service level 3 306.

Figure 3B:
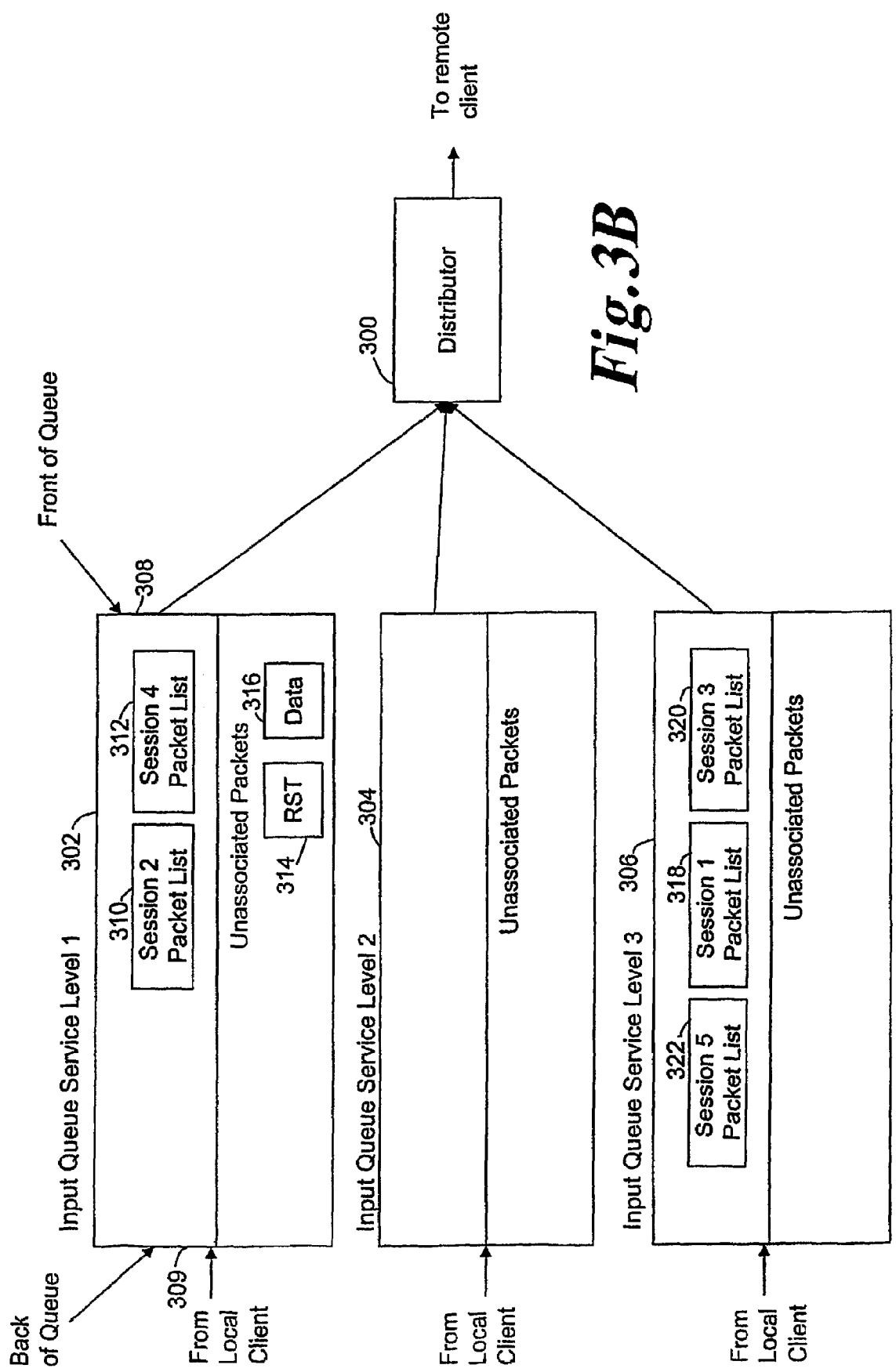
FIG. 3B is a block diagram of a distributor integration function according to an embodiment of the present invention.

In FIG. 3B, based on a Quality of Service algorithm (not shown) the distributor has determined that it is appropriate to send a service level 3 packet to the remote client, thus the distributor retrieves one or more packets from the session 5 packet list 322 at the top of the service level 3 input queue 306. The input queue service level 3 then moves the session 5 packet list 322 to the bottom of the queue 309.

Next, in FIG. 3C, the distributor has determined that it is appropriate to send a service level 1 packet to the remote client (not shown). Since the service level 1 input queue 302 includes packets that are not associated with any sessions the input queue service level 1 may send the unassociated data packet 316 to the distributor and may not send any packets from the session 4 packet list 312. Thus, the session 4 packet list 312 remains at the top of the queue 308 and the data packet 316 is transferred to the distributor 300 and from there to the remote client.

Next, in FIG. 3D, the distributor has determined that it is appropriate to send a service level 3 packet to the remote client (not shown), so the distributor receives packets from the session 3 packet list 320, which is then moved to the bottom of the queue 309.

Figure 3E:
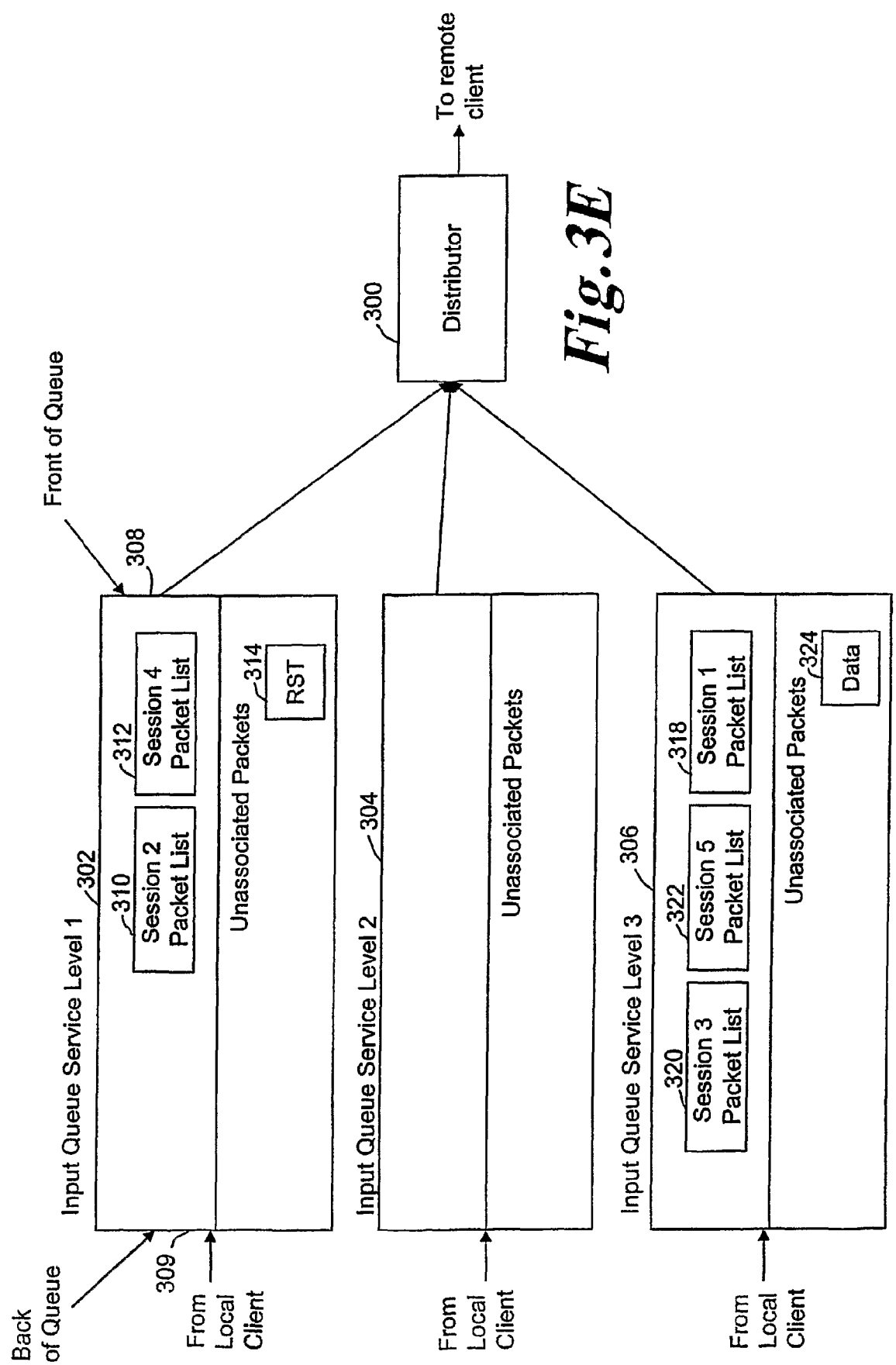
FIG. 3E is a block diagram of a distributor integration function according to an embodiment of the present invention.

Next in FIG. 3E, a new data packet 324 is received from a local client. The data packet 324 has a service level 3 and is not associated with any TCP session, thus the data packet 324 is placed in the input queue service level 3 queue.

Next in FIG. 3F, the distributor has determined that it is appropriate to send a service level 1 packet to the remote client (not shown), so the remaining unassociated service level 1 packet, RST packet 314, is sent from the input queue service level 1 302 to the distributor 300 and from there to the remote client.

Figure 3G:
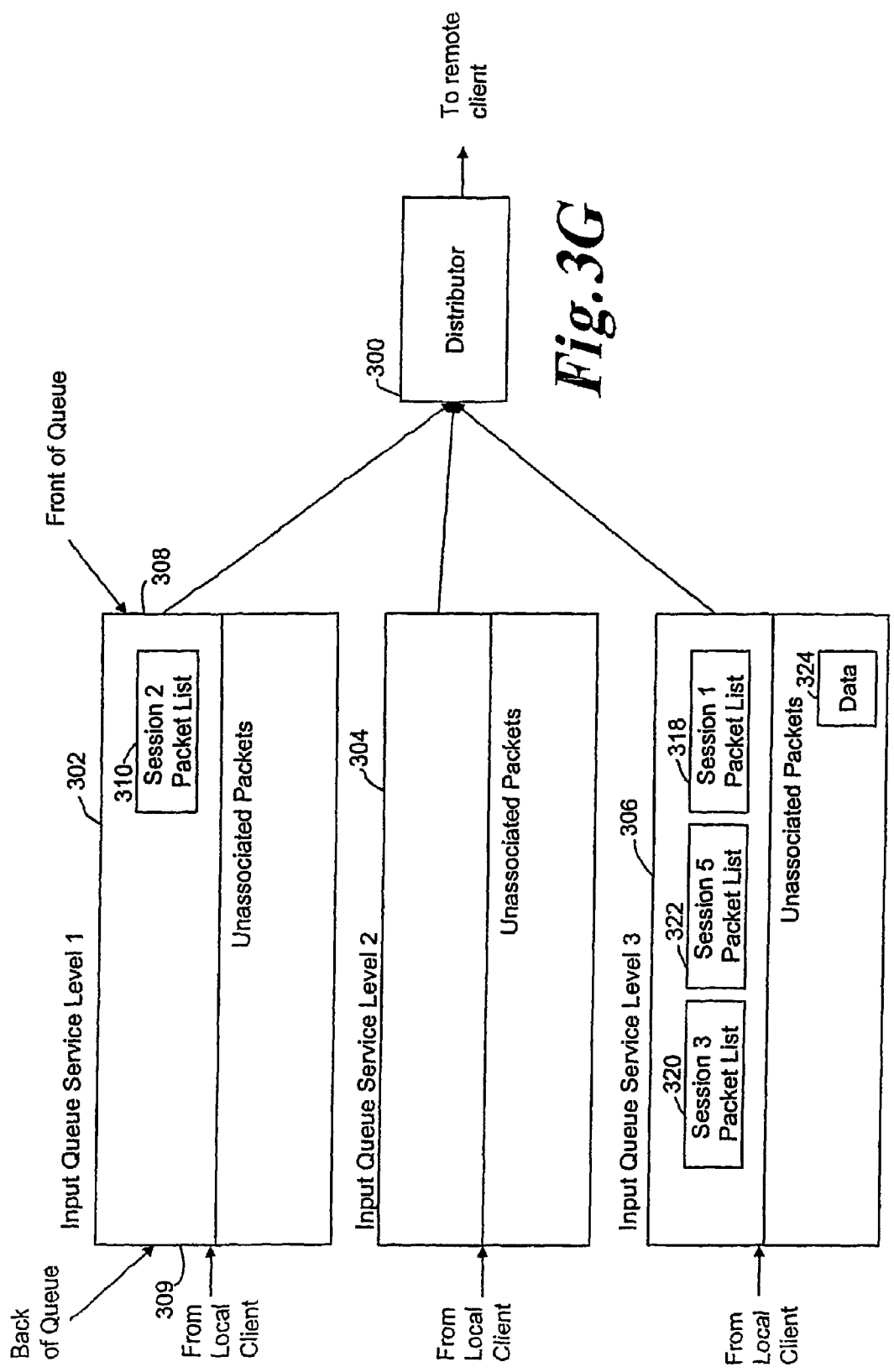
FIG. 3G is a block diagram of a distributor integration function according to an embodiment of the present invention.

Next in FIG. 3G, the distributor still seeks to send service level 1 packets, thus it retrieves packets from the session 4 packet list 312 located at the top of the service level 1 queue 302. Further, in this case the distributor was able to retrieve all the remaining packets in the session 4 list 312 and no additional session 4 packets are received from the local client, thus the session 4 packet list is removed completely from the input queue service level 1 302.

Next in FIG. 3H, the distributor has determined that it is appropriate to send service level 3 packets. Thus, the distributor 300 retrieves the data packet 324 and at least one packet from the session 5 packet list 322. Thus, the session 5 packet list 322 is moved to the bottom of the queue 309.

Thus, an acceleration apparatus according to the present invention may take into account the service level associated with a packet when deciding when to send that packet and thereby ensure fairness across TCP sessions within a given service level and across all service levels.

In addition, the present invention may include an emergency memory recovery feature that may automatically respond to changes in resource requirements at a client. In particular, the feature may reduce an amount of memory allocated to a most stale session and make that memory available to the application or session requesting the memory. The invention may also completely abort the most stale session to make its memory available for other uses. The invention may abort the session by sending an abort signal from one or more of the acceleration clients to a local client (e.g., from the first acceleration apparatus to the first client) to more gracefully terminate the session. The most stale session is the TCP session for which the most time has passed since that TCP session successfully transferred a packet from one client to another.

Figure 4:
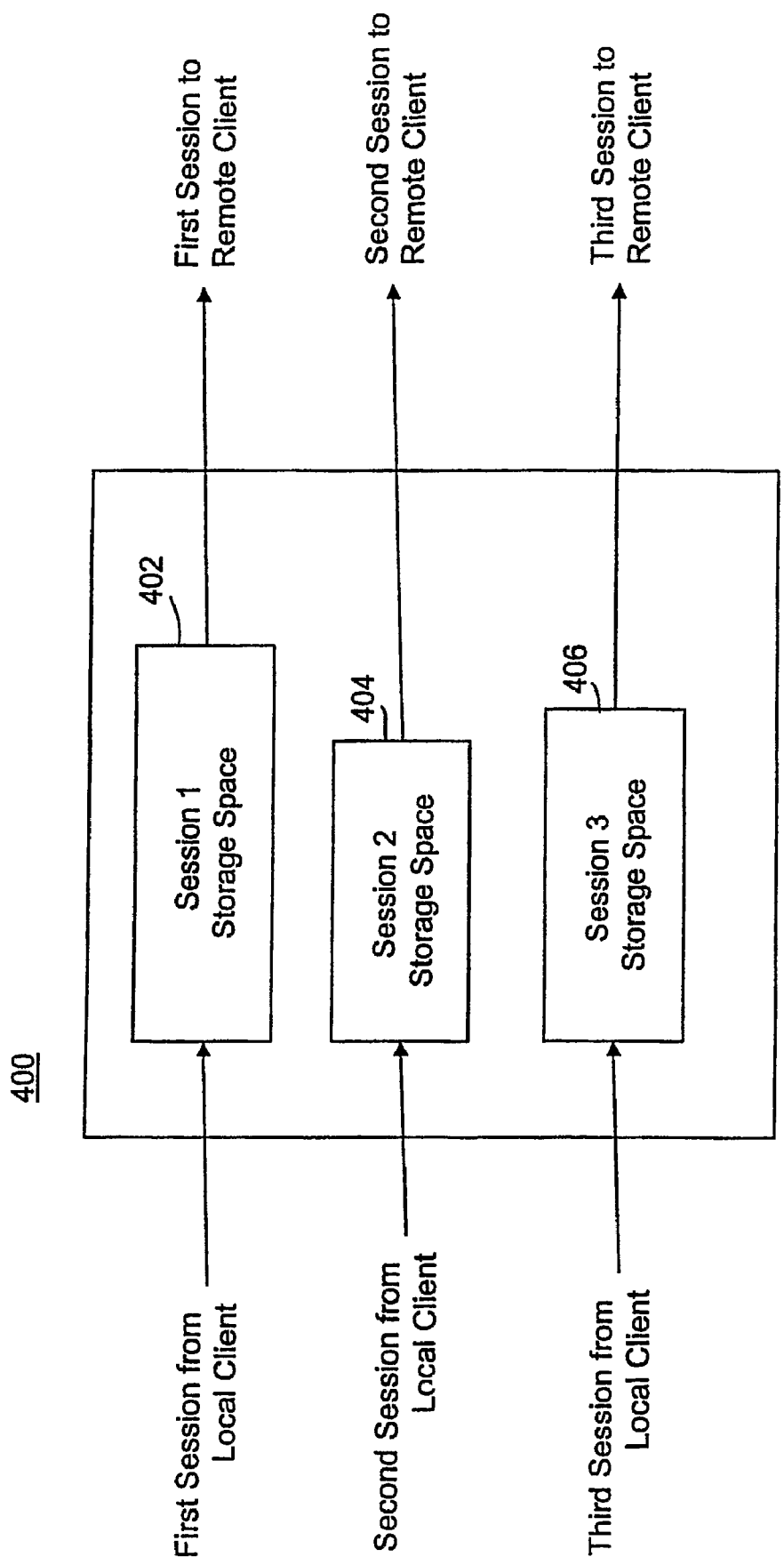
FIG. 4 is a block diagram of a session storage space in an acceleration apparatus according to an embodiment of the present invention.

FIG. 4 is a block diagram of acceleration apparatus 400 configured to perform emergency memory recovery according to an embodiment of the present invention. Acceleration apparatus 400, in the present example, includes three storage areas configured to store information associated with each of three different communication sessions. Session 1 storage space 402 has a first size and is configured to receive and store information in a first session from a local client and to send the information to a remote client. Session 2 storage space 404 has a second size and is configured to receive and store information in a second session from the local client and to send the information to the remote client. Session 3 storage space 406 has a third size and is configured to receive and store information in a third session from the local client and to send the information to the remote client. Although this example includes three sessions from one local client to one remote client, the invention also includes the ability to send and receive sessions from plural different clients with plural different sessions.

In the example of FIG. 4, if the first session requests increased throughput and thereby requires greater storage space, the acceleration apparatus 400 is configured to reduce the memory allocated to one or more of the second and third sessions. In particular, memory is deallocated from the session that has least recently transmitted a packet, and the deallocated memory is allocated to session 1, thereby increasing session 1 storage space 402. For example, if a second session packet was last ACKed two seconds earlier and a third session packet was last ACKed three seconds earlier, then the third session is determined to be more stale, and thus memory is deallocated from session 3 storage space 406 and allocated to session 1 storage space 402.

Thus, emergency memory recovery according to the present invention efficiently manages memory allocation for the acceleration system on a per session basis and allows identification and recovery from adverse conditions caused by acceleration or other factors.

In addition, the acceleration apparatus may be configured to fade idle sessions to recover and reallocate resources associated with the session. An idle session is one that has not transmitted or received a packet for a predetermined time. An idle session may be faded by forgetting it and no longer handling any packets or sending ACKs for that session.

When receiving a packet from the middle of a session (e.g., a push data packet of any kind) the acceleration apparatus may resurrect a previously faded session by rediscovering communication parameters from a subsequently received packet associated with that session.

The present invention also includes a resource management throttling function that efficiently detects which sessions are exhibiting a peak transfer rate below the channel maximum transfer rate, and accordingly manages computing resources, such as memory and CPU cycles. The resource management throttling function sets a maximum session limit which provides an absolute upper limit for the number of sessions. Further, in the present invention, peer acceleration apparatuses may communicate and negotiate the maximum session limit number dynamically. The maximum number of possible accelerated TCP sessions may be determined based on memory and processor availability, and other computing status factors, including, for example, the default minimum send ahead size. Since the TCP acceleration apparatus may also be hosting other services aside from the enhanced TCP acceleration function, the resource management throttling function may dynamically change the maximum number of possible accelerated TCP sessions based upon changing computing conditions.

Periodically, the TCP acceleration apparatuses (e.g., first acceleration apparatus 104 and second acceleration apparatus 208) inform each other of their capacity for accelerating sessions using redundant header space from user traffic or via other communication means. Each acceleration apparatus may set its session limit to the lowest of its own capacity and its peer's reported capacity. Locally received packets (i.e., from the local client) for new sessions may be dropped when the number of sessions is at or above these limits. Non-SYN packets received from the remote acceleration apparatus for unknown sessions may be responded to with a RST.

A receiving acceleration apparatus may control memory availability. Back-channel notification may be sent from the receiving acceleration apparatus to the remote acceleration apparatus on a per-session basis by reusing redundant space in the IP and TCP headers or by other communication methods. The receiving acceleration apparatus may decide on an initial allocation for the session. When memory is scarce and sessions are numerous, or under other resource limiting circumstances, a minimal amount of memory may be assigned to the session. Alternatively, when memory is available and sessions are few, a full BDP may be allocated. If a session receives an update from the remote client lowering its peer window below the amount outstanding, no special action may be taken and the TCP acceleration apparatus may simply wait until the window is open before sending new traffic.

For accelerated TCP sessions, it may not be possible to wait for return traffic to set the initial peer window size. The present invention allows a default minimum send ahead size of approximately one packet per session, which is considered when estimating the maximum session count.

To avoid unneeded latency and excessive memory usage when a receiving client has a limited receive speed, the rate at which the retransmission queue is emptied may be calculated and used to replace the link bandwidth when calculating the BDP. If the number is smaller, then the session may be asked to return some of its memory to a global pool. The present invention also may avoid leaving a session with a disproportionately large amount of memory when the session count rises and when that session is initially assigned a large amount of memory for BDP by asking that session to return some memory space.

When a session is using more memory than it is assigned, it may inform its remote peer, possibly by sending a generated duplicate ACK of its new memory size. The peer may then be expected to back off on transmissions. Once the session is using less memory, it can inform the global session manager of its new allocation status. Whenever such an update occurs, sessions which have a disproportionately small share of memory may be assigned the newly available space for immediate usage. The peer may be informed about the newly available space on the next reverse-direction packet.

The resource management throttling function may allocate memory to a TCP session based on the speed of the slowest "fast segment" in series with the link. Thus, only sufficient memory may be allocated for the accelerated TCP session to reach the bandwidth of the slowest fast segment in series with the link, but not more than that amount of memory. For example, if Fast Segment A 102 operates at 1 MB/s and Fast Segment B 110 operates at 0.05 MB/s, the throttled resource management feature may dynamically allocate the amount of memory required for acceleration of the TCP session to result in a perceived rate of acknowledgment from Client B 112 comparable to the rate of acknowledgement of the slowest series communication segment. That is, in this example, resources may be allocated sufficient to achieve the rate of acknowledgement for a 0.05 MB/s segment.

To gracefully reduce the resources allocated to a particular TCP session, an acceleration apparatus according to an embodiment of the present invention may take one or more of the following steps: a) ignore one or more SYN signals from an associated client, b) negotiate a new BDP with the other acceleration layer, c) change a TCP window size for all sessions from a particular client and inform that client of the new TCP window size.

In particular, the method may dynamically calculate a BDP (Bandwidth Delay Product) for each segment in series with a TCP session, and allocate memory to the session based on the calculated BDP. A BDP calculated by one of the first or second acceleration layer is communicated to the other acceleration layer. BDP for a segment is the segment bandwidth times the segment delay. So, for example if slow segment 106 has a 550 ms delay and 4 Mbit bandwidth, it requires a 275,000 byte bandwidth delay product. Alternatively, if client B 112 is acknowledging traffic at a rate of 1 Mbit, it only requires 68750 bytes of bandwidth delay product, despite the ability of fast segment B 110 to send accommodate a higher rate.

In other words, the present invention may determine a maximum number of sessions based on an amount of available computing resources (and in particular an amount of memory) at each of the first and second acceleration apparatuses and a bandwidth of the communication channel. Further, each acceleration apparatus may dynamically allocate resources based on resource information from the other acceleration layer. Resource information includes a proposed BDP and a number of sessions that an acceleration layer is allowed to initiate. A number of sessions that an acceleration layer is allowed to initiate may be based on a historical trend of session initiation. The resource information is sent from the first acceleration layer to the second acceleration layer using a BDP communication protocol and using a proposed BDP communication message. The resource information may also be sent using ACK messages.

Path MTU discovery is a process wherein a router sends an Internet Control Message Protocol (ICMP) message back to a transmitting client informing it that a transmitted packet was too large for the link it would be sent over. In the nominal case, when conventional TCP acceleration is not employed, the endpoint host may resend the packet at a smaller size. However, in conventional TCP acceleration, the transmitting endpoint host has already received and acknowledged the offending packet and thus cannot retransmit it.

The present invention includes a Path MTU Chopping feature in which an acceleration apparatus (e.g., first acceleration apparatus 104) intercepts an ICMP message and TCP packets from a local client (e.g., client A 100) and reformats the TCP packets into smaller TCP packets so that they may continue to their destination. Further, some client TCP stack implementations advertise a normal Maximum Segment Size (MSS), but then only ever open their receive windows to a size smaller than the MSS, which causes a problem under conventional TCP acceleration.

In the present invention, a chopping/resegmenting feature may detect the window size of the destination and determine if the window size is opening up. If it is determined that the window size is not opening up, the chopping feature chops the already acknowledged TCP packets in order to transmit them, thereby overcoming the misreporting of the MSS by the endpoint host. In other words, the chopping/resegmenting feature may detect when a packet has not been sent for a predetermined amount of time and figure out what is the actual max segment size (i.e., determined MSS) of a client based on observing the window size utilized by the client. This feature may dynamically adapt/resegment the utilized segment size to match the determined MSS. This feature may also allow the acceleration device to dynamically change max MSS whenever the max MSS of a path changes (e.g., path MTU discovery when a router leaves a network and a different path is employed using a router with a different max MSS).

Figure 5:
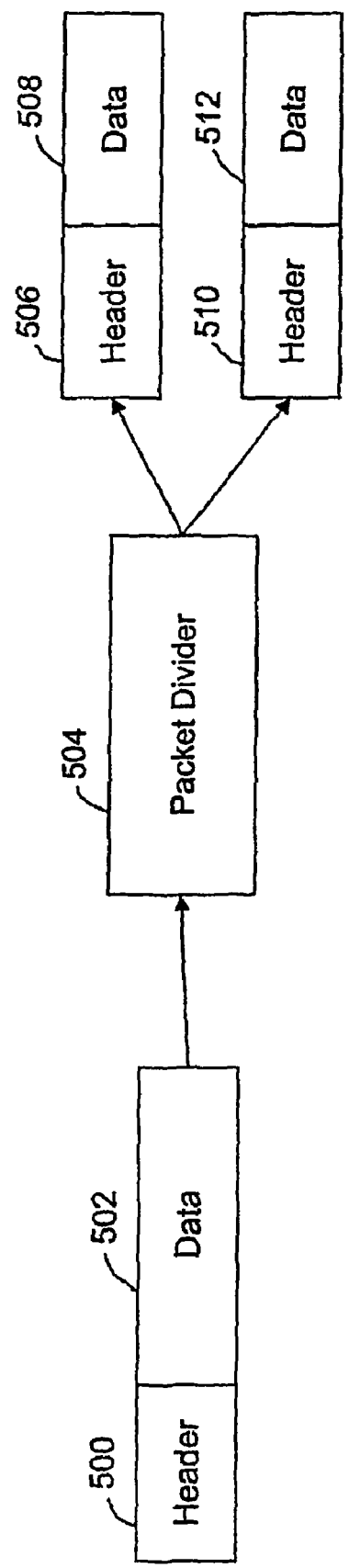
FIG. 5 is a block diagram of a packet divider function in an acceleration apparatus according to an embodiment of the present invention.

FIG. 5 is a block diagram of packets flowing through a packet divider 504 in an embodiment of an acceleration apparatus (e.g., second acceleration apparatus 108). In this example, a local client (e.g., client B 112) is reporting a first window size, but is also configured to only open its window size to a second window size, which is smaller than the first window size. A packet including header 500 and data 502 having a received packet data size according to the first window size may be received by the packet divider 504 in the acceleration apparatus. The packet divider 504 generates two packets: a first packet having header 506 and data 508, and a second packet having header 510 and data 512. The size of the first and second packets is selected by the packet divider 504 to match the determined MSS of the local client (e.g., client B 112) based on the second window size, which is less than the received packet data size. The first and second packets are successfully received by the local client because they match the actual MSS of the second client.

Although a conventional TCP acceleration scheme may send one ACK packet for each ACK packet received from a local client, the present invention may include an ACK reduction feature that collects plural ACKs from a local client and sends one or more aggregated ACK signals across the slow link representing the plural received ACKs. The remote acceleration apparatus that receives the aggregated ACK expands the aggregated ACK into plural TCP ACKs prior to transmitting to its associated client. The first acceleration layer may determine when to send an aggregated ACK across the slow segment based on any of the following factors: an elapsed or interval time, a number of ACK signals received from an associated client, a bandwidth of a segment, or a latency of a segment.

Figure 6:
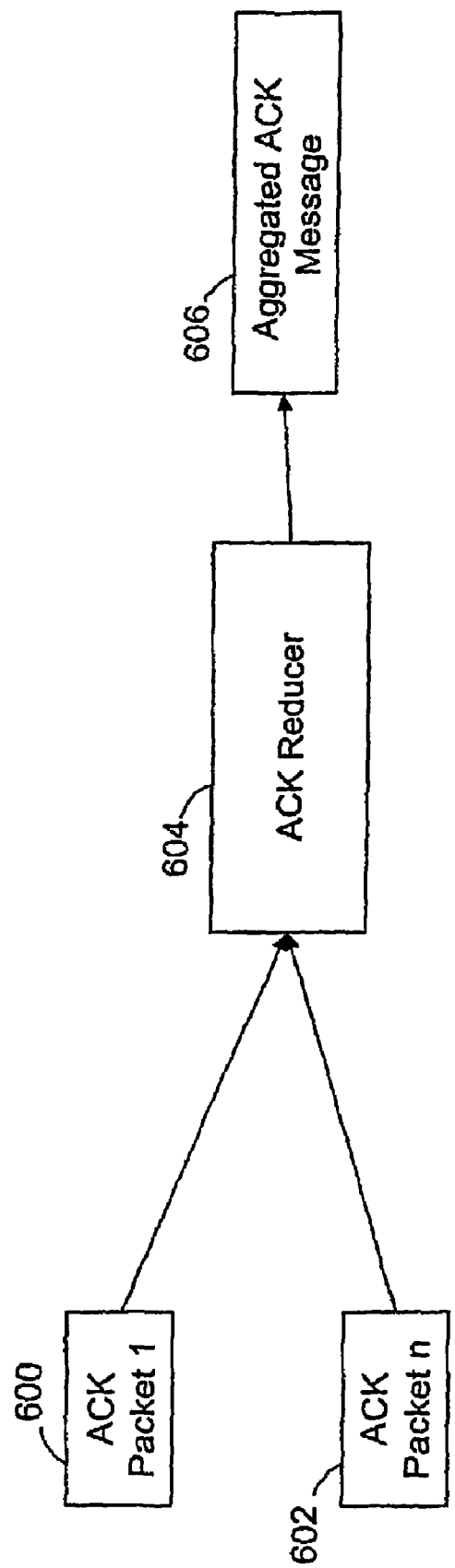
FIG. 6 is a block diagram of an ACK reduction function in an acceleration apparatus according to an embodiment of the present invention.

FIG. 6 shows an example of an ACK reducer 604 in an acceleration apparatus (e.g., first acceleration apparatus 104) that includes an ACK reduction feature. In this example, n ACK packets 600/602 are received at the acceleration apparatus from a local client (e.g., client A 100). The ACK reducer 604 creates an aggregated ACK message 606 and sends that message to the remote acceleration apparatus (e.g., second acceleration apparatus 108), where TCP packets corresponding to the received packets 600/602 are generated (not shown) and sent to the remote client (e.g., client B 112). Although this example shows a single aggregated ACK message, the invention includes generating plural ACK aggregated messages from plural received ACK packets.

An aggregated ACK message may include a type field, a client ID field and an ACK count field to represent the received ACK messages. For example, the aggregated ACK message format may include an eight bit type field, a 16 bit client ID field, and a 32 bit ACK count field. The aggregated ACK message may also include other fields, for example a memory negotiation field. For example, a memory negotiation field may include a size of a retransmit buffer (RETX buffer) and a size of a send-ahead window used by the session and representing a size of the peer's RETX buffer.

In addition, a compressed header format may be used to communicate TCP header information across the slow link (e.g., slow segment 106). The compressed header may be expanded to a normal TCP format by a receiving acceleration layer before being forwarded to an associated client.

Figure 7:
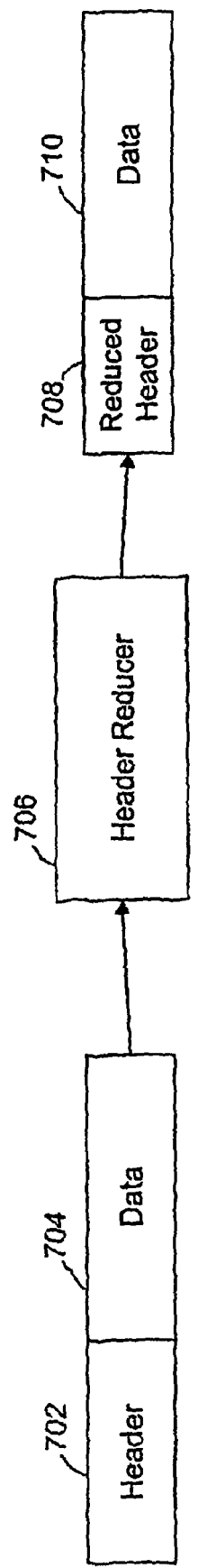
FIG. 7 is a block diagram of a header reducer function in an acceleration apparatus according to an embodiment of the present invention.

FIG. 7 is a block diagram showing a header reducer 706 in an acceleration apparatus (e.g., first acceleration apparatus 104) according to an embodiment of the present invention. The header reducer 706 receives a packet with header 702 and data 704, where the header 702 has a received header size. The header reducer 706 generates an output packet including a reduced header 708 and data 710. The size of the reduced header 708 is less than the received header size and may not be compatible with a standard TCP header format, however, the remote acceleration apparatus (e.g., second acceleration apparatus 108) that receives the output packet knows how to interpret the contents of the reduced header 708 and therefore is able to produce (not shown) and send standard TCP packets to its local client (e.g., client B 112) based on the output packet.

The present invention also includes an ability to compress messages transmitted between the acceleration apparatuses and an ability to decide when compression is appropriate based on at least the following factors at one of the acceleration apparatuses: availability of waiting packets, compressibility of packets, and availability of computing resources. If the conditions are satisfied, the acceleration apparatus may take information from N packets received from a local client and compresses that information to fit within M transmitted compressed packets. The M packets will be sent across the slow segment, where M<N.

Figure 8:
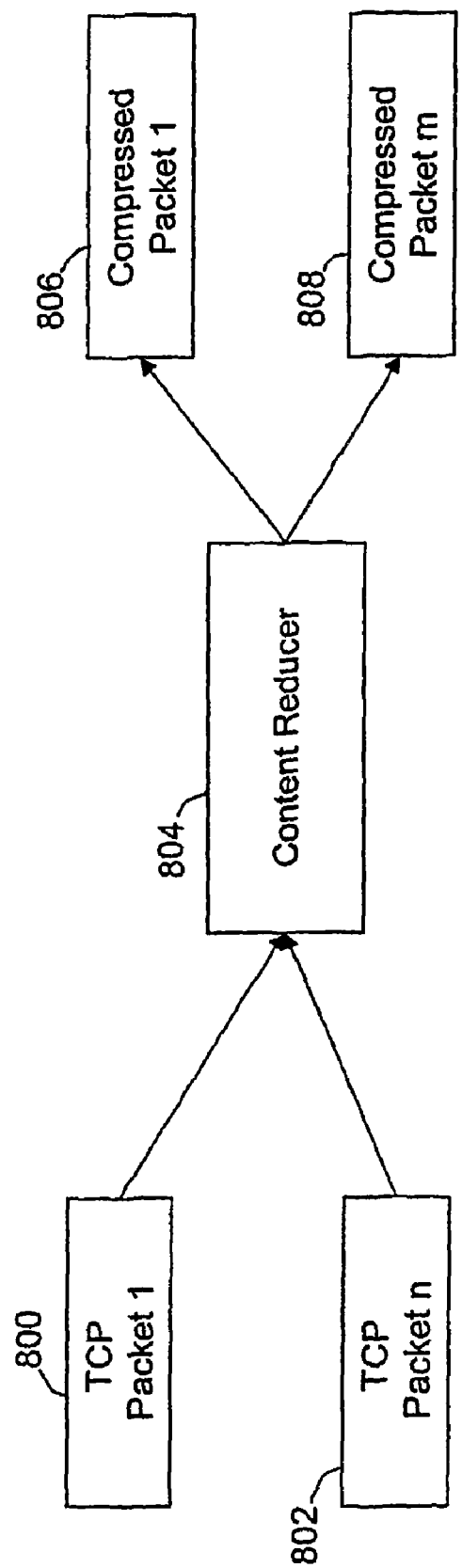
FIG. 8 is a block diagram of a content reducer function in an acceleration apparatus according to an embodiment of the present invention.

FIG. 8 shows a block diagram having a content reducer 804 in an acceleration apparatus (e.g., first acceleration apparatus 104) according to an embodiment of the present invention. The content reducer 804 is configured to receive n TCP packets 800/802 from a local client (e.g., client A 100) and to generate m compressed packets 806/808 including the information in the received n TCP packets 800/802. The remote acceleration apparatus is configured to receive and expand (not shown) the compressed packets to produce standard TCP packets that are sent to the remote client (e.g., client B 112).

In addition, the present invention may maintain plural simultaneous IP spaces in the same acceleration layer/apparatus. An IP space is the collection of legal IP addresses within that space (e.g., the Internet address space). It may be convenient to allow plural users sharing a common acceleration apparatus to each be able to allocate IP addresses according to their own private IP space without concern for addresses assigned by other users. Accordingly, the present invention has the ability to operate plural different IP spaces simultaneously within a single acceleration apparatus.

Further, the present invention includes an ability to maintain a dedicated retransmission layer or layers. The dedicated retransmission layer or layers, which are different and separate from the TCP sessions allocated for normal user communication purposes, may be used to carry all retransmission packets or requests for retransmission resulting from packet retransmissions in the user communication sessions.

Figure 9:
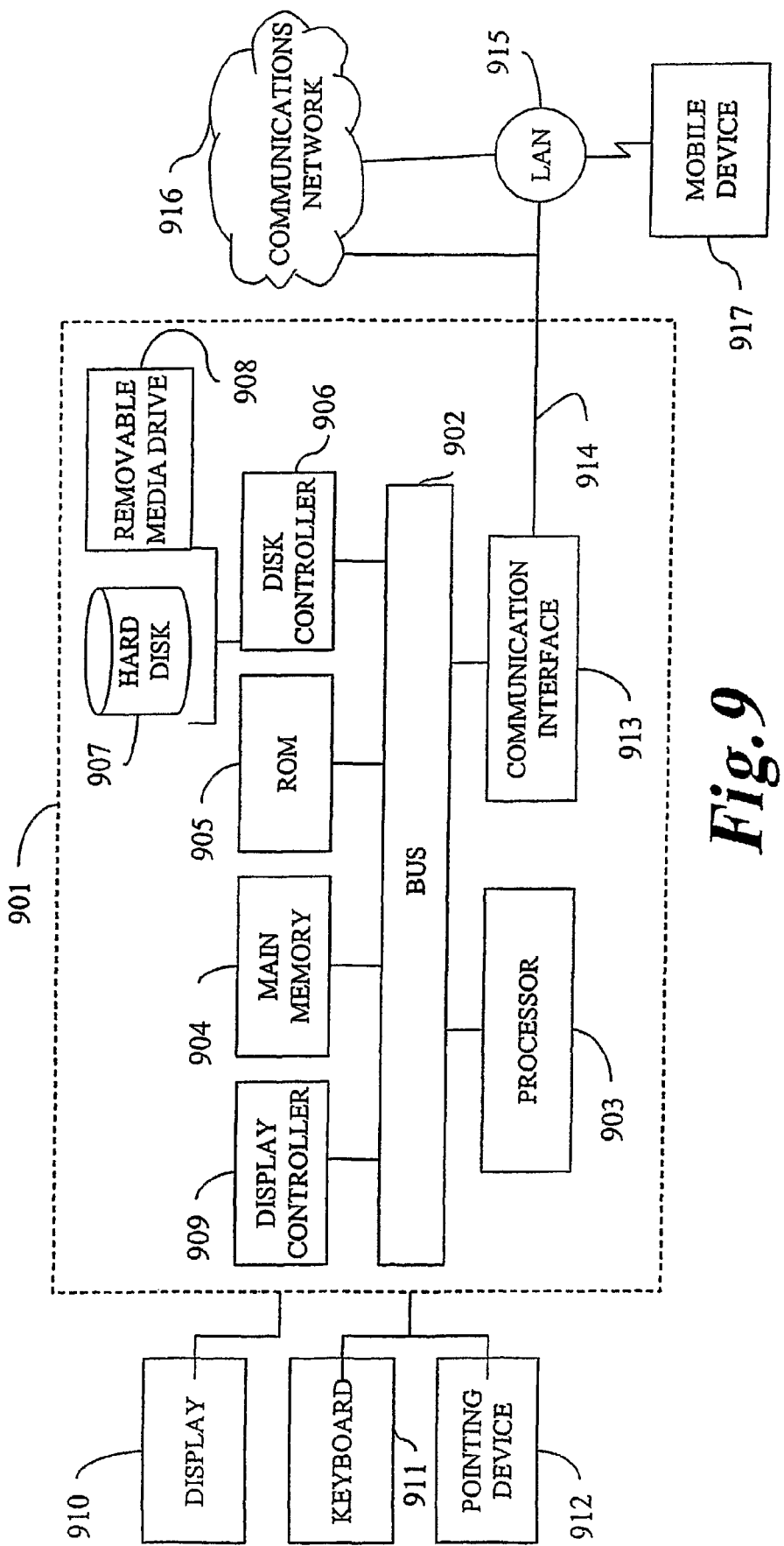
FIG. 9 is a block diagram of a computer implemented embodiment of the present invention.
Figure 10:
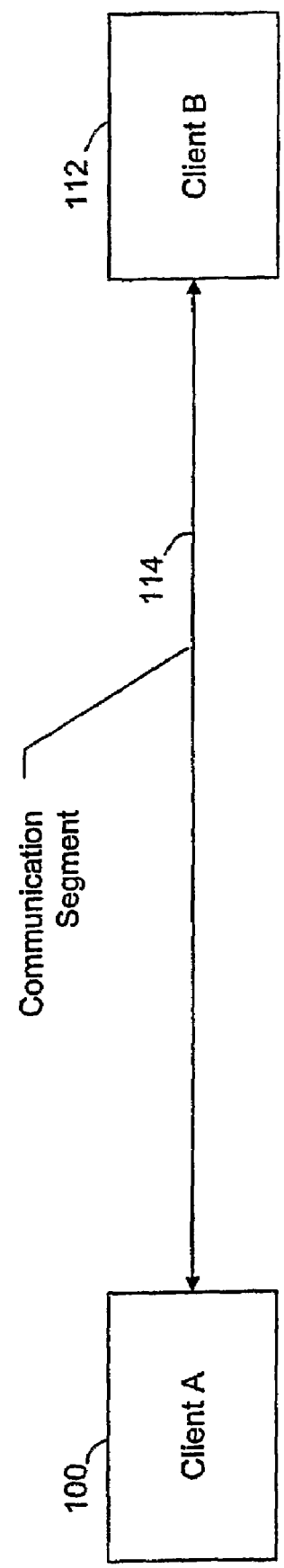
FIG. 10 is a block diagram of a conventional unaccelerated communication system.

FIG. 9 illustrates a computer system 901 upon which an embodiment of the present invention may be implemented. The computer system 901 includes a bus 902 or other communication mechanism for communicating information, and a processor 903 coupled with the bus 902 for processing the information. The computer system 901 also includes a main memory 904, such as a random access memory (RAM) or other dynamic storage device (e.g., dynamic RAM (DRAM), static RAM (SRAM), and synchronous DRAM (SDRAM)), coupled to the bus 902 for storing information and instructions to be executed by processor 903. In addition, the main memory 904 may be used for storing temporary variables or other intermediate information during the execution of instructions by the processor 903. The computer system 901 further includes a read only memory (ROM) 905 or other static storage device (e.g., programmable ROM (PROM), erasable PROM (EPROM), and electrically erasable PROM (EEPROM)) coupled to the bus 902 for storing static information and instructions for the processor 903.

The computer system 901 also includes a disk controller 906 coupled to the bus 902 to control one or more storage devices for storing information and instructions, such as a magnetic hard disk 907, and a removable media drive 908 (e.g., floppy disk drive, read-only compact disc drive, read/write compact disc drive, compact disc jukebox, tape drive, and removable magneto-optical drive). The storage devices may be added to the computer system 901 using an appropriate device interface (e.g., small computer system interface (SCSI), integrated device electronics (IDE), enhanced-IDE (E-IDE), direct memory access (DMA), or ultra-DMA).

The computer system 901 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 901 may also include a display controller 909 coupled to the bus 902 to control a display 910, such as a cathode ray tube (CRT), for displaying information to a computer user. The computer system includes input devices, such as a keyboard 911 and a pointing device 910, for interacting with a computer user and providing information to the processor 903. The pointing device 912, for example, may be a mouse, a trackball, or a pointing stick for communicating direction information and command selections to the processor 903 and for controlling cursor movement on the display 910. In addition, a printer may provide printed listings of data stored and/or generated by the computer system 901.

The computer system 901 performs a portion or all of the processing steps of the invention in response to the processor 903 executing one or more sequences of one or more instructions contained in a memory, such as the main memory 904. Such instructions may be read into the main memory 904 from another computer readable medium, such as a hard disk 907 or a removable media drive 908. One or more processors in a multi-processing arrangement may also be employed to execute the sequences of instructions contained in main memory 904. In alternative embodiments, hard-wired circuitry may be used in place of or in combination with software instructions. Thus, embodiments are not limited to any specific combination of hardware circuitry and software.

As stated above, the computer system 901 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 901, for driving a device or devices for implementing the invention, and for enabling the computer system 901 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 903 for execution. A computer readable medium may take many forms, including but not limited to, non-volatile media, volatile media, and transmission media. Non-volatile media includes, for example, optical, magnetic disks, and magneto-optical disks, such as the hard disk 907 or the removable media drive 908. Volatile media includes dynamic memory, such as the main memory 904. Transmission media includes coaxial cables, copper wire and fiber optics, including the wires that make up the bus 902. Transmission media also may also take the form of acoustic or light waves, such as those generated during radio wave and infrared data communications.

Various forms of computer readable media may be involved in carrying out one or more sequences of one or more instructions to processor 903 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 901 may receive the data on the telephone line and use an infrared transmitter to convert the data to an infrared signal. An infrared detector coupled to the bus 902 can receive the data carried in the infrared signal and place the data on the bus 902. The bus 902 carries the data to the main memory 904, from which the processor 903 retrieves and executes the instructions. The instructions received by the main memory 904 may optionally be stored on storage device 907 or 908 either before or after execution by processor 903.

The computer system 901 also includes a communication interface 913 coupled to the bus 902. The communication interface 913 provides a two-way data communication coupling to a network link 914 that is connected to, for example, a local area network (LAN) 915, or to another communications network 916 such as the Internet. For example, the communication interface 913 may be a network interface card to attach to any packet switched LAN. As another example, the communication interface 913 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 913 sends and receives electrical, electromagnetic or optical signals that carry digital data streams representing various types of information.

The network link 914 typically provides data communication through one or more networks to other data devices. For example, the network link 914 may provide a connection to another computer through a local network 915 (e.g., a LAN) or through equipment operated by a service provider, which provides communication services through a communications network 916. The local network 914 and the communications network 916 use, for example, electrical, electromagnetic, or optical signals that carry digital data streams, and the associated physical layer (e.g., CAT 5 cable, coaxial cable, optical fiber, etc). The signals through the various networks and the signals on the network link 914 and through the communication interface 913, which carry the digital data to and from the computer system 901 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 901 can transmit and receive data, including program code, through the network(s) 915 and 916, the network link 914 and the communication interface 913. Moreover, the network link 914 may provide a connection through a LAN 915 to a mobile device 917 such as a personal digital assistant (PDA) laptop computer, or cellular telephone.

Numerous modifications and variations of the present invention are possible in light of the above teachings. It is therefore to be understood that within the scope of the appended claims, the invention may be practiced otherwise than as specifically described herein.

The invention claimed is:

1. A TCP acceleration apparatus for sending packets to a destination client, said apparatus comprising:
   plural input queues each associated with a service level and configured to store plural session packet lists having packets from different TCP sessions stored in a same input queue, each session packet list including packets from only one TCP session, each input queue associated with a service level, and all packets in the plural session packet lists having the service level of the input queue in which the packets are stored;
   a distributor connected to the input queues and to the client, said distributor configured to remove a packet from a selected session packet list at a top of an input queue for transmission to the client; and
   said input queue at the service level selected by the distributor further configured to move the selected session packet list to a bottom of the input queue after the packet is removed by the distributor.

2. The apparatus of claim 1, wherein
   the plural input queues are further configured to store a non-session packet list including a list of packets not associated with any TCP session, each of the packets in the list of packets not associated with any TCP session stored in a particular input queue having the service level of the input queue, and
   the distributor is further configured to retrieve a packet from the non-session packet list before removing the packet from the session packet list at the top of the input queue.

3. The apparatus of claim 1, wherein
   the distributor is further configured to select an input queue from which to retrieve a packet for transmission to the client based on the service level of the input queue.

4. The apparatus of claim 1, further comprising:
   a processor that controls the input queues is configured to suspend activity for a suspended input queue when the service level of the suspended input queue is lower than a service level of a packet being retrieved by the distributor for transmission to the client.

5. The apparatus of claim 1, wherein packets from a same TCP session are not stored on a different input queue.

6. A TCP acceleration method comprising steps of:
   receiving plural session packet lists;
   storing each received session packet list in an input queue with session packet lists having packets from different TCP sessions stored in a same input queue, each session packet list including packets from only one TCP session, each input queue associated with a service level, and all packets in the plural session packet lists having the service level of the input queue in which the packets are stored;
   selecting a service level for transmission to a client by a distributor;
   transferring a selected packet from a selected session packet list at a top of a selected input queue having the selected service level to the distributor;
   moving the selected session packet list to a bottom of the selected input queue after the selected packet is transferred; and
   transmitting the selected packet from the distributor to the client.

7. The method of claim 6, further comprising steps of:
   storing a non-session packet list including a list of packets not associated with any TCP session in at least one input queue, each of the packets in the list of packets not associated with any TCP session stored in a particular input queue having the service level of the input queue; and
   transferring a packet from the non-session packet list to the distributor before transferring the selected packet from the selected session packet list at the top of the input queue.

8. The method of claim 6, further comprising a step of suspending activity in a suspended input queue when a service level of the suspended input queue is lower than a service level of a packet transferred to the distributor for transmission to the client.

9. The method of claim 6, further comprising a step of removing a session packet list from an input queue after all packets in the session packet list are transferred to the distributor.

10. A computer program product having computer program instructions which when executed by a computer cause the computer to perform the following steps:
   receiving plural session packet lists;
   storing each received session packet list in an input queue with session packet lists having packets from different TCP sessions stored in a same input queue, each session packet list including packets from only one TCP session, each input queue associated with a service level, and all packets in the plural session packet lists having the service level of the input queue in which the packets are stored;
   selecting a service level for transmission to a client by a distributor;
   transferring a selected packet from a selected session packet list at a top of a selected input queue having the selected service level to the distributor;
   moving the selected session packet list to a bottom of the selected input queue after the selected packet is transferred; and
   transmitting the selected packet from the distributor to the client.

11. The computer program product of claim 10, further including instructions causing the computer to perform steps of:
   storing a non-session packet list including a list of packets not associated with any TCP session in at least one input queue, each of the packets in the list of packets not associated with any TCP session stored in a particular input queue having the service level of the input queue; and
   transferring a packet from the non-session packet list to the distributor before transferring the selected packet from the selected session packet list at the top of the input queue.

12. The computer program product of claim 10, further including instructions causing the computer to perform a step of suspending activity in a suspended input queue when a service level of the suspended input queue is lower than a service level of a packet transferred to the distributor for transmission to the client.

13. The computer program product of claim 10, further including instructions causing the computer to perform a step of removing a session packet list from an input queue after all packets in the session packet list are transferred to the distributor.

14. A TCP acceleration system comprising:
   an acceleration apparatus having
      plural input queues each associated with a service level and configured to store plural session packet lists having packets from different TCP sessions stored in a same input queue, each session packet list including packets from only one TCP session, each input queue associated with a service level, and all packets in the plural session packet lists having the service level of the input queue in which the packets are stored;
      a distributor connected to the input queues and to a client, said distributor configured to remove a packet from a selected session packet list at a top of an input queue for transmission to the client; and
      said input queue at the service level selected by the distributor further configured to move the selected session packet list to a bottom of the input queue after the packet is removed by the distributor.

15. The system of claim 14, wherein
   the plural input queues are further configured to store a non-session packet list including a list of packets not associated with any TCP session, each of the packets in the list of packets not associated with any TCP session stored in a particular input queue having the service level of the input queue, and
   the distributor is further configured to retrieve a packet from the non-session packet list before retrieving the packet from the session packet list at the top of the input queue.

16. The system of claim 14, wherein
   the distributor is further configured to select an input queue from which to retrieve a packet for transmission to the client based on the service level of the input queue.

17. The system of claim 14, further comprising:
   a processor that controls the input queues is configured to suspend activity for a suspended input queue when the service level of the suspended input queue is lower than a service level of a packet being retrieved by the distributor for transmission to the client.

18. The system of claim 14, wherein packets from a same TCP session are not stored on a different input queue.

19. The system of claim 14, wherein a session packet list is removed from an input queue after all packets in the session packet list are retrieved by the distributor.

* * * * *